United States Patent
Kreitmair-Steck

(10) Patent No.: US 9,453,516 B2
(45) Date of Patent: Sep. 27, 2016

(54) BLADE ROTARY ASSEMBLY WITH AERODYNAMIC OUTER TOROID SPOILER FOR A SHROUDED PROPULSION ROTARY ASSEMBLY

(71) Applicant: AIRBUS HELICOPTERS DEUTSCHLAND GMBH, Donauworth (DE)

(72) Inventor: Wolfgang Kreitmair-Steck, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 703 days.

(21) Appl. No.: 14/248,509

(22) Filed: Apr. 9, 2014

(65) Prior Publication Data
US 2014/0321968 A1    Oct. 30, 2014

(30) Foreign Application Priority Data

Apr. 29, 2013 (EP) .................... 13400008

(51) Int. Cl.
| | |
|---|---|
| *F04D 3/00* | (2006.01) |
| *F04D 29/32* | (2006.01) |
| *B64C 11/00* | (2006.01) |
| *B64C 27/82* | (2006.01) |

(52) U.S. Cl.
CPC ........... *F04D 29/326* (2013.01); *B64C 11/001* (2013.01); *B64C 27/82* (2013.01); *B64C 2027/8254* (2013.01)

(58) Field of Classification Search
CPC ............. B64C 11/001; B64C 2027/8254; B64C 27/82; F04D 29/326
See application file for complete search history.

(56) References Cited

U.S. PATENT DOCUMENTS

| | | | |
|---|---|---|---|
| 3,241,791 A | * | 3/1966 | Piasecki ............. B64C 27/82 244/17.19 |
| 4,585,391 A | | 4/1986 | Vuillet et al. |
| 4,809,031 A | | 2/1989 | Sakaguchi et al. |
| 4,911,612 A | | 3/1990 | Rodde et al. |
| 4,927,331 A | | 5/1990 | Vuillet |
| 5,102,068 A | | 4/1992 | Gratzer |
| 5,131,604 A | | 7/1992 | Yoerkie, Jr. et al. |

(Continued)

FOREIGN PATENT DOCUMENTS

| | | |
|---|---|---|
| DE | 19752369 | 5/1999 |
| FR | 2534222 | 4/1984 |

OTHER PUBLICATIONS

Extended European Search Report for EP 134000082, Completed by the European Patent Office, Dated Sep. 23, 2013, 5 pages.

*Primary Examiner* — Jesse Bogue
(74) *Attorney, Agent, or Firm* — Brooks Kushman P.C.

(57) ABSTRACT

An inside vessel arrangement (5) is fixedly secured in a stator hollow structure (8) and has at least one enlarged static circumference housing (20), and an aerodynamic outer toroid spoiler (18) has an outer external surface (35) complementary to the static circumference housing (20). The aerodynamic outer toroid spoiler (18) radially secured to each of outer tips (23) of rotor blades (10) of a driven rotor system (7). A torus air gap (G) is provided, so that an outer laminar flux (56) is admitted simultaneously with an inlet inner stream (54) and guided through the torus air gap (G), with the inlet main stream and outer laminar flux being converged to merge together in single outlet control airflow (C). The invention typically applies e.g. to vehicles (A) such as aircrafts like rotary wing aircrafts.

20 Claims, 5 Drawing Sheets

(56) References Cited

U.S. PATENT DOCUMENTS

| | | |
|---|---|---|
| 5,306,119 A | 4/1994 | Bandoh et al. |
| 5,542,818 A | 8/1996 | Monvaillier et al. |
| 5,566,907 A | 10/1996 | Marze et al. |
| 5,588,618 A | 12/1996 | Marze et al. |
| 5,634,611 A * | 6/1997 | Marze ............... B64C 27/82 244/17.19 |
| 6,736,600 B1 | 5/2004 | Bannasch |
| 7,959,105 B2 | 6/2011 | Marze |
| 8,061,962 B2 | 11/2011 | Marze |
| 2003/0099543 A1* | 5/2003 | Freeman ............ B64C 11/001 415/199.4 |
| 2009/0014581 A1* | 1/2009 | Kebrle ................. B64C 27/82 244/17.21 |
| 2010/0148515 A1* | 6/2010 | Geddry ............... F03B 17/061 290/55 |
| 2011/0217163 A1 | 9/2011 | Camci et al. |
| 2013/0170985 A1* | 7/2013 | Altmikus ............ B64C 27/82 416/3 |

* cited by examiner

BLADE ROTARY ASSEMBLY WITH AERODYNAMIC OUTER TOROID SPOILER FOR A SHROUDED PROPULSION ROTARY ASSEMBLY

CROSS REFERENCE TO RELATED APPLICATION

This application claims priority to European patent application EP 13400008.2, filed on Apr. 29, 2013, the content of which is incorporated in its entirety by reference herein.

BACKGROUND OF THE INVENTION (1) Field of the Invention

The invention concerns a blade rotary assembly including an aerodynamic outer toroid spoiler, a shrouded propulsion rotary assembly and a vehicle.

(2) Description of Related Art

The most general technical domain of the invention is the domain of propulsion rotor assemblies, for creating airflows by rotating blades (i.e. airfoil designs providing a "fan like" effect). In short, such shrouded propulsion rotary assemblies include mainly a driven rotor system including the blades, and a stator hollow structure.

The stator hollow structure include a hollow duct defining an inside vessel surface. The driven rotor system is functionally mounted inside the hollow duct. Each blade has an inner shank (root) radially opposed to an outer tip, mechanically coupled to a central hub of the driven rotor system. Each blade also has an outer tip. Being motorized/mechanically driven by a motion source, blades in the driven rotor system are rotated when required, for creating airflows.

In most shrouded propulsion rotary assemblies, the outer tips of the blades are generally free ended (not being linked to other tips). Such outer tips are distant/separated from neighboring outer tips by an angular free spacing. Such outer tips are also remote from the inside vessel surface of the stator hollow structure by a radial air spacing. Other way speaking, in most shrouded propulsion rotary assemblies, only the inner shanks of the blades are mechanically coupled to the central hub.

During operation, the free outer tips of the blades withstand considerable efforts, and provoke deleterious stresses, turbulences and noise.

In traditional helicopters, a main rotor is having an upright rotational axis for forward movement/hovering of the aircraft and an open-type tail rotor having a transverse axis. Together with direction controlling actions, such open-type tail rotor is providing compensation of the torque reaction of the main rotor.

More and more, these open-type tail rotor have been replaced by shrouded (i.e. ducted) propulsion rotary assemblies, in order to reduce noise, to enhance direction controlling, and to increase the security as well as the reliability from failure. Inspired from the basic concept of a shrouded/ducted fan, many types of shrouded propulsion rotary assemblies for helicopter tails have been proposed.

For preparing the instant application, the following prior art documents were considered: DE19752369, FR2534222, U.S. Pat. No. 4,585,391, U.S. Pat. No. 4,809,031, U.S. Pat. No. 4,911,612, U.S. Pat. No. 4,927,331, U.S. Pat. No. 5,102,068, U.S. Pat. No. 5,131,604, U.S. Pat. No. 5,306,119, U.S. Pat. No. 5,542,818, U.S. Pat. No. 5,588,618, U.S. Pat. No. 5,634,611, U.S. Pat. No. 6,736,600, U.S. Pat. No. 8,061,962, U.S. Pat. No. 7,959,105, US2011/0217163.

Teaching of the prior art is sometimes antagonistic. For instance, were proposed in the prior art related to tail arranged shrouded propulsion rotary assemblies:

to increase thrust, a rotating hub may have a radius of about 40% that of the tunnel. A helicopter equipped with a directional and stabilizing device having a faired and slanted anti torque rotor and a dissymmetric <<V>>;

to enhance the conditions encountered towards the end of the blade, are provided evolutions of curvature in some regions avoid shock wave. The evolutions of curvature in some regions towards the end of the blade ensure a progressive recompression of the flow. The evolutions of curvature in some regions towards the end of the blade ensure a decreasing in intensity in the vicinity of the trailing edge. And recompression avoids a premature separation of the boundary layer. This is giving low values of coefficient of drag for high coefficients of lift towards the end of the blade;

to minimize pressure losses across the blades by a small clearance (of about 2.5 mm) between the tips of the blades and the surface of the airflow duct, with a magnitude of the clearance dimension versus the overall fan assembly diameter to about 1 m for most purposes;

to reduce the noise from the tail rotor, the tip speed is reduced and the rotor blades are arranged at unequal angular intervals;

to provide rotor blades with swinging pitch horns, and to change a pitch angle of respective rotor blades. To have a first type of rotor blades having a larger mounting angle to obtain a predetermined thrust and a second type of rotor blades at a smaller mounting angle;

to have an air flow rectifying stator is located in the channel after the rotor blades and lying at an angle to the radial direction and inclined in the opposite direction to the rotor blades.

The blades of the rotor which can rotate in the transverse duct have an angular distribution according to an uneven azimuth modulation given by the following sinusoidal law.

In a helicopter with mid-sized mass, the counter-torque rotor have blades driven with a given peripheral blade tip speed in a duct of about 1.1 meter in diameter. A flow straightening arrangement comprises vanes, mostly profiled ones with a given chord and to which the transmission arm is added. Thus is applied a distorted sinusoidal law in order to obtain phase modulation leading to no angle between two arbitrary blades, equal to any angle between two arbitrary vanes.

For minimizing the noise emitted by a ducted tail rotor anti-torque device at a frequency and perceived at another frequency, the diameter, the number of blades and the tangential speed of the rotor are determined so that the perceived frequency is less than or equal to the bottom limit frequency of a predetermined one-third frequency octave centered on a third frequency.

Furthermore, for optimizing the complete blade, it is generally advantageous, from the standpoint of yield, to have, especially in the case of a shrouded propeller, a span wise distribution of lift, which increases from the hub up to the end of the blade. The end sections, for which the relative speed is highest, therefore also operate with the highest coefficients of lift of adaptation. It is known that the coefficient of lift of adaptation is the coefficient of lift at which the section must work with a minimum coefficient of drag and for which it is defined.

Additionally, it is known that, for the known sections, the increase in the speed and the coefficient of lift is translated by an increase in the coefficient of drag and this increase is faster as the Reynolds number is lower, which is the case for the applications envisaged by the present invention.

The use of known sections therefore leads to deleterious losses and the yield of a shrouded propeller presenting such a known section remains too low for some aircrafts.

The document U.S. Pat. No. 5,566,907 describes rigidly secured blades of a rotor which can rotate in a transverse duct and that have an angular distribution according to an uneven azimuth modulation given by a sinusoidal law: The angular position of the blades are counted in series from an arbitrary origin.

The document U.S. Pat. No. 7,959,105 describes an aircraft having a streamlined stator pierced by an air flow duct defined around an axis of symmetry. The aircraft has a shrouded rotor with rotary blades arranged in said static air flow duct. The periphery of the static air flow duct is provided in succession of a first lip, a second lip and of a first rear portion at the side of the duct that is closer to the rear end of the aircraft. The second lip has a second front portion situated at the side of the duct that is closer to the front of the aircraft. The aircraft is fitted with blower means for reducing the noise generated by the shrouded rotor and suitable for propelling compressed air towards a first injection zone opening out into the first rear front portion and to a second injection zone opening out to the second front portion, in the stator.

Despite of advantages provided, remains a need for a unit propelling compressed air towards the injection zone which in some way compensates the negative effects of the inlet flow separation at the leading side of the inlet lip for cross-wind air flows. However, this document, only showing rotary blades with free outer tips, does not solve the problems of hub corner separation and of lip clearance losses.

The document US2011/0217163 describes a double-ducted fan that includes a hub, a rotor having a plurality of blades with free outer tips. A stator first duct, a stator second duct, and a stator channel are defined. The first duct circumscribes the rotary free outer tips of the blades, and the second duct circumscribes the first duct. The channel is configured to direct air flow cross-wise to the first duct over a top of the first duct into the inlet side of the fan. The second duct is movable relative to the first duct to adjust a portion of the channel. The length of the first duct is different from the length of the second duct.

This document is especially applicable for isolated ducted fans but not for shrouded tail rotors. Tail rotors are different in that they have no outer wall of the shroud. Furthermore, this document does not solve the problem of lip clearance loss, since there is still a gap between the inner wall of the shroud and the rotor tips.

The document U.S. Pat. No. 5,102,068 describes a spiroid tipped wing. This spiroid-tipped wing, in its basic form, comprises a wing-like lifting surface and a spiroid tip device integrated so as to minimize the induced drag of the wing-spiroid combination and/or to alleviate noise effects associated with concentrated vortex effect wakes that trail from lifting surfaces. The ends of the spiroid are attached to the wing tip at appropriate sweep and included angles to form a continuous and closed extension of the wing surface.

For a fixed wing aircraft the spiroid configuration on the right side is of opposite hand to that on the left side. The spiroid geometry incorporates airfoil cross sections with specified thickness, camber and twist. The airfoil thickness varies in relation to the local sweep angle being a minimum at an intermediate position where the sweep angle is zero. The camber and twist vary approximately linearly and change sign at some intermediate position between the spiroid ends so as to produce the optimum spiroid loading. Increasing the size of the spiroid in relation to the overall span of the lifting surface is used to further reduce drag and noise. The concept of the spiroid-tipped wing may include the use of more than one spiroid on each wing tip in any number of forms which may be selected to be adaptable to other design requirements and operational limitations. More generally the spiroid wing tip system is a generic geometric concept which can be adapted to achieve drag reduction and noise for most applications which incorporate wings or wing-like devices (i.e. lifting surfaces) such as helicopters, propellers, etc. including non-aeronautical applications.

This document has the target to reduce the induced drag at the wing tips of ordinary wings of aircraft. Despite this technique could in theory be applied for reducing the lip clearance losses of ducted/shrouded tail rotors, the specific constructions which are proposed in the patent are difficult to realize. Furthermore, the invention would not provide solutions for inlet lip separation and for hub corner separation.

The document DE19752369 describes a drive body which is based on principles derived from the vortex flow of the wings of gliding birds. At its origin, or in wingspan direction from the wing root to the wing tip, the transverse drive creating structure is connected to a long base part (base wing) to provide overall an almost continuous distribution of the transverse drive at the transition point to two narrower transverse drive bodies which merge with each other without sharp bends.

The drive body is based on principles derived from the vortex flow of the wings of gliding birds. At its origin, or in wingspan direction from the wing root to the wing tip, the transverse drive creating structure is connected to a long base part (base wing) to provide overall an almost continuous distribution of the transverse drive at the transition point to two narrower transverse drive bodies which merge with each other without sharp bends.

This document is proposed in order to reduce the induced drag of wings of aircraft with a light-weight but mechanically stable construction. This concept has been developed for larger aircraft wings and does not seem to be helpful for the optimization of a shrouded anti-torque rotor.

The document U.S. Pat. No. 6,736,600 describes a rotor, which in operation is flown through by a fluid in a main flow direction, the rotor having a rotor blade arranged rotatable around a rotor axis and extending at least partially away from the rotor axis into the fluid. To reduce the trailed tip vortex at the end of the rotor blades, the fluidic losses, as well as the flow noise, the rotor blade is split into at least two partial blades at a predetermined distance from the rotor axis and forms a loop. One partial blade extends in the direction of rotation in relation to the rotor blade. The other partial blade extends in a direction opposite the direction of rotation to the rotor blade. The two partial blades are interconnected in one piece at their ends, to encompass a loop surface extending essentially crosswise to the main direction of flow, through which the fluid flows.

As per this document, the split of the rotor blade in two parts could be applied to shrouded tail rotors, in order to optimize the air flow through the shroud/duct.

Though, limits and drawbacks remains, despite the valuable enhancements brought to such tail arranged shrouded propulsion rotary assemblies.

However, there is still a need for further optimizations in order to increase the efficiency and further reduction of the noise. Such an increase of efficiency could make the ducted tail rotor an alternative also for larger helicopters which at the moment still need to rely on conventional tail rotors.

BRIEF SUMMARY OF THE INVENTION

The invention is therefore useful by offering a high aero dynamical efficiency, including propulsion effect enhancement, as well as noise reduction and comfort increase offered by the vehicle having one or a plurality of such rotary assemblies. This further positively impacts energy consumption of the vehicle.

Objectives of the invention are summarized in view of the above.

The invention relates specifically to enhancement of aerodynamics behavior of such shrouded propulsion rotary assemblies. A general problem solved by the invention is to further increase security, performance, fail-safe reliability and aero dynamical efficiency of the rotary assemblies known from prior art. Among others, three problems related to shrouded propulsion rotary assemblies are solved by the invention.

The first problem is related to the so-called "tip clearance loss". The tip clearance loss is due to turbulences in the gap between the tip of the tail rotor blade and the wall of the shroud/duct due to a free airflow from the bottom to the top of the rotor blade. In general, these turbulences result in vortices in this gap which cause induced drag, vibrations and disturbing sound. Induced drag and noise increase as the size of the gap increase.

The second problem is related to the so-called "inlet lip separation". If the inlet airflow is not in the direction of the axis of the rotor and the duct, there results an imbalance of airflow due to flow separation at the inlet lip of the duct at the leading side of the rotor. This lip separation not only limits the thrust power and the controllability of the thrust, but also induces vibratory loads and noise due to turbulent and re-circulatory air flow. This effect is already significant at low forward speeds of the helicopter (e.g. at a speed of more than 10 m/s), and gets more severe when the speed increases. When in combination with tip clearance loss, inlet lip separation can cause significant aerodynamic losses and temporal instabilities because of the rotor breathing low-momentum and turbulent flow.

The third problem is related to the so-called "hub corner separation". If the inlet airflow is cross-wise i.e. not exactly in the direction of the rotor and shroud axis, there will be an airflow separation at the trailing side of the hub, similar to the inlet lip separation. Therefore, this effect yields to additional losses of thrust.

All three problems have negative impact on the thrust power of classical shrouded propulsion rotary assemblies, e.g. tail rotors, on the controllability of the thrust, and on vibratory loads as well as sound emissions.

The invention has the objective of increasing the efficiency and performance, while further reducing the noise level of shrouded propulsion rotary assemblies e.g. for tail rotors. This is achieved by a significant improvement of the aerodynamic performance, especially by:

reducing the induced drag from the tip clearance and consequently significantly reducing the noise caused by mini-vortices at the gaps between the rotor tips and the wall of the shroud.

reducing the air flow separation at the inlet lip on the leading side of the shrouded/ducted tail rotor.

reducing the air flow separation at the trailing side of the hub.

Some industrial application and useful effects of the invention are now summarized.

In the non-limitative examples, the invention concerns a shrouded propulsion rotary assembly in a vehicle, this vehicle being a rotary wing aircraft. For instance, the shrouded propulsion rotary assembly is in an anti-torque rotor, such as the ones located on a tail boom of a rotary wing aircraft, e.g. a helicopter.

But among examples of vehicle, allowing industrial application of the invention is e.g., automotive, ship, train, aircraft (where a shrouded propulsion provokes altitude/direction/advancement).

Some objects of the invention of the invention are now summarized. These objects are detailed in the appended claims.

An object of the invention is a propulsion rotor assembly for a vehicle; the propulsion rotor assembly being motorized or mechanically driven through a motion source; the propulsion rotor assembly having at least: a driven rotor system to be rotated around a rotary axis also called longitudinal "pivoting" axis and a stator hollow structure housing the driven rotor system; the stator hollow structure having a central hub and a hollow duct defining an inside vessel surface; the inside vessel surface being extending along the longitudinal rotary axis between two longitudinally opposed transverse distal openings; the driven rotor system being functionally mounted in the inside vessel surface, pivotal on the central hub and having a plurality of blades; the blades being motorized/mechanically driven by the motion source, so that the blades are rotated around the longitudinal rotary axis, when a controlled airflow is required; the blades have a shank radially opposed to an outer tip, with the blade shank being mounted on the central hub, while the blades are locally separated from neighboring blades by an angular air spacing.

The propulsion rotor assembly of the invention includes:
an inside vessel arrangement fixedly secured in the stator hollow structure in at least one of the transverse distal openings, the inside vessel arrangement having an enlarged static circumference housing opened towards the outside of the stator hollow structure;

an aerodynamic outer toroid spoiler in the shape of a profiled airfoil type; the aerodynamic outer toroid spoiler being shaped with an outer external surface complementary to the static circumference housing, but smaller than the static circumference housing; the aerodynamic outer toroid spoiler being pivotally linked and radially secured to each outer tip of the blades, so that the outer toroid spoiler is: longitudinally upright with a distal opening of the circumference enlarged housing, radially remote from the circumference enlarged housing with the outer external surface facing the static circumference housing and distanced from the static circumference housing by a torus air gap; so that an outer laminar flux is admitted simultaneously with an inlet inner stream and guided through the torus air gap between the circumference enlarged housing and the aerodynamic outer toroid spoiler towards the transverse distal opening longitudinally opposed to the circumference enlarged housing, and the inlet main stream and outer laminar flux are converged to smoothly merge together in a single outlet airflow.

In an embodiment, the aerodynamic outer toroid spoiler is mechanically linked to the outer tips of the rotor blades forming a continuous circular ring, and the aerodynamic outer toroid spoiler having a front portion leading edge and a rear portion trailing edge, the rear portion trailing edge defining a converging angle comprised between 5 and 30 degrees.

In an embodiment, the aerodynamic outer toroid spoiler is having a front portion leading edge and a rear portion trailing edge, the rear portion trailing edge defining a converging area at a longitudinal direction location in the stator hollow structure closer to an outlet opposed distal opening of the stator hollow structure than to an inlet distal opening of the circumference enlarged housing.

In an embodiment, the aerodynamic outer toroid spoiler is having a front portion leading edge located longitudinally backwards of a backwards decay comprised between 1 mm and 50 mm.

In an embodiment, the aerodynamic outer toroid spoiler is having a front portion leading edge and a rear portion trailing edge outwardly joined by the outer external surface, and an inside cylindrical surface joining the front portion leading edge and the rear portion trailing edge.

In an embodiment, the aerodynamic outer toroid spoiler is having an outer external surface joining a front portion leading edge and a rear portion trailing edge outwardly, the outer external surface being cone shaped and having a linear outer profile oriented relative the longitudinal rotary axis, by an acute stream-flux ducted angle comprised between 0.1 and 30 degrees.

In an embodiment, the aerodynamic outer toroid spoiler is having a front portion leading edge and a rear portion trailing edge and an inside cylindrical surface joining the front portion leading edge and the rear portion trailing edge, the inside cylindrical surface being radially flush with a rear portion of the inside vessel arrangement and radially separated from the front portion of the inside vessel arrangement by the torus air gap.

In an embodiment, the aerodynamic outer toroid spoiler is having a front portion leading edge and a rear portion trailing edge and an inside cylindrical surface joining the front portion leading edge and the rear portion trailing edge, the inside cylindrical surface being flush and parallel to flush with a rear portion of the inside vessel arrangement.

In an embodiment, the aerodynamic outer toroid spoiler is having a front portion leading edge and a rear portion trailing edge and an inside cylindrical surface joining the front portion leading edge and the rear portion trailing edge, the inside cylindrical surface and a rear portion of the inside vessel arrangement being oriented relative to the longitudinal rotary axis by an inside expansion angle comprised between 0 and 10 degrees.

In an embodiment, the aerodynamic outer toroid spoiler is having a front portion leading edge and a front transverse distal opening together with the static circumference housing defining an inlet mouth for the torus air gap, the inlet mouth having an outer convex surface of a rounded shape and an inner convex surface of a rounded shape, facing one another.

In an embodiment, the aerodynamic outer toroid spoiler is having a chord line of a longitudinal dimension chosen, respective to a longitudinal overall dimension of the inside arrangement vessel, comprised between ⅓ (one third) and ½ (one half).

In an embodiment, the torus air gap is having a longitudinal dimension chosen, respective to a longitudinal overall dimension of the inside arrangement vessel, comprised between ½ and ¾.

In an embodiment, each rotor blade have an outer tip section fixed to a rotatable connecting disk and extended into a movable dry-disk fixation point which is inserted into a bearing means of the inside vessel arrangement, the outer tip section having a V-shaped ending defining a separation hollow zone, for guidance of the air flow and reducing the air turbulences in the inside vessel arrangement.

Another object of the invention is a method for producing a controlled airflow from a propulsion rotor assembly for a vehicle; the propulsion rotor assembly being motorized or mechanically driven through a motion source; the propulsion rotor assembly having at least:

a driven rotor system to be rotated around a longitudinal rotary axis and a stator hollow structure housing the driven rotor system; the stator hollow structure having a central hub and a hollow duct defining an inside vessel surface; the inside vessel surface being extending along the longitudinal rotary axis between two longitudinally opposed transverse distal openings; the driven rotor system being functionally mounted in the inside vessel surface, pivotal on the a central hub and having a plurality of blades; the blades being motorized/mechanically driven by the motion source, so that the blades are rotated around the longitudinal rotary axis, when the controlled airflow is required; the blades have a shank radially opposed to an outer tip, with the blade shank being mounted on the central hub, while the blades are locally separated from neighboring blades by an angular air spacing.

The method of the invention includes:

an inside vessel arrangement step of providing in the stator hollow structure at least one of the transverse distal openings with an enlarged static circumference housing opened towards the outside of the stator hollow structure;

a toroid spoiler provision step of producing an aerodynamic outer toroid spoiler in the shape of a profiled airfoil type; the aerodynamic outer toroid spoiler being shaped with an outer external surface complementary to the static circumference housing, but smaller than the circumference enlarged housing;

a tip to spoiler securing step, of pivotally linking and radially securing the aerodynamic outer toroid spoiler to each outer tip of the blades, so that the outer toroid spoiler is: longitudinally upright with a distal opening of the circumference enlarged housing, radially remote from the circumference enlarged housing with the outer external surface facing the circumference enlarged housing and distanced from the circumference enlarged housing by a torus air gap; and a controlled airflow producing step, having:

an inlet inner stream crossing stage, wherein an inlet inner stream is crossing the inside of the aerodynamic outer toroid spoiler and passing through the blades;

an outer simultaneous admitting stage wherein an outer laminar flux is admitted simultaneously with the inlet inner stream and guided through the torus air gap between the circumference enlarged housing and the aerodynamic outer toroid spoiler towards the transverse distal opening longitudinally opposed to the circumference enlarged housing; and a converging stage wherein the inlet main stream and outer laminar flux are converging to smoothly merge together in a single outlet airflow.

In an embodiment, the inlet inner stream crossing stage and the outer simultaneous admitting stage are respectively performed along an inlet inner direction and an outer admitting direction, the inlet inner direction being oriented respective to the outer admitting direction with an acute stream-flux ducted angle.

In an embodiment, the converging stage is performed with the inlet main stream and the outer laminar flux directed one relatively the other by a converging angle comprised between 0.1 and 30 degrees.

In an embodiment, the converging stage is performed at a converging area located in the longitudinal direction location of the stator hollow structure, closer to the opposed distal opening of the stator hollow structure than to the distal opening of the circumference enlarged housing.

A further object of the invention is a vehicle equipped with at least one propulsion rotor assembly; the vehicle being chosen in the group including: aircrafts, ships, trains, and automobiles.

In an embodiment, the propulsion rotor assembly is having a stator hollow structure, the stator hollow structure being articulated on a holding structure of the vehicle, by at least one of: pivotal means, swiveled means or slidably movable means.

In an embodiment, the vehicle is a rotary wing aircraft.

BRIEF DESCRIPTION OF THE SEVERAL VIEWS OF THE DRAWINGS

Presently preferred embodiments of the invention are presented in the following description with reference to the attached drawings.

DETAILED DESCRIPTION OF THE INVENTION

Figure 1:
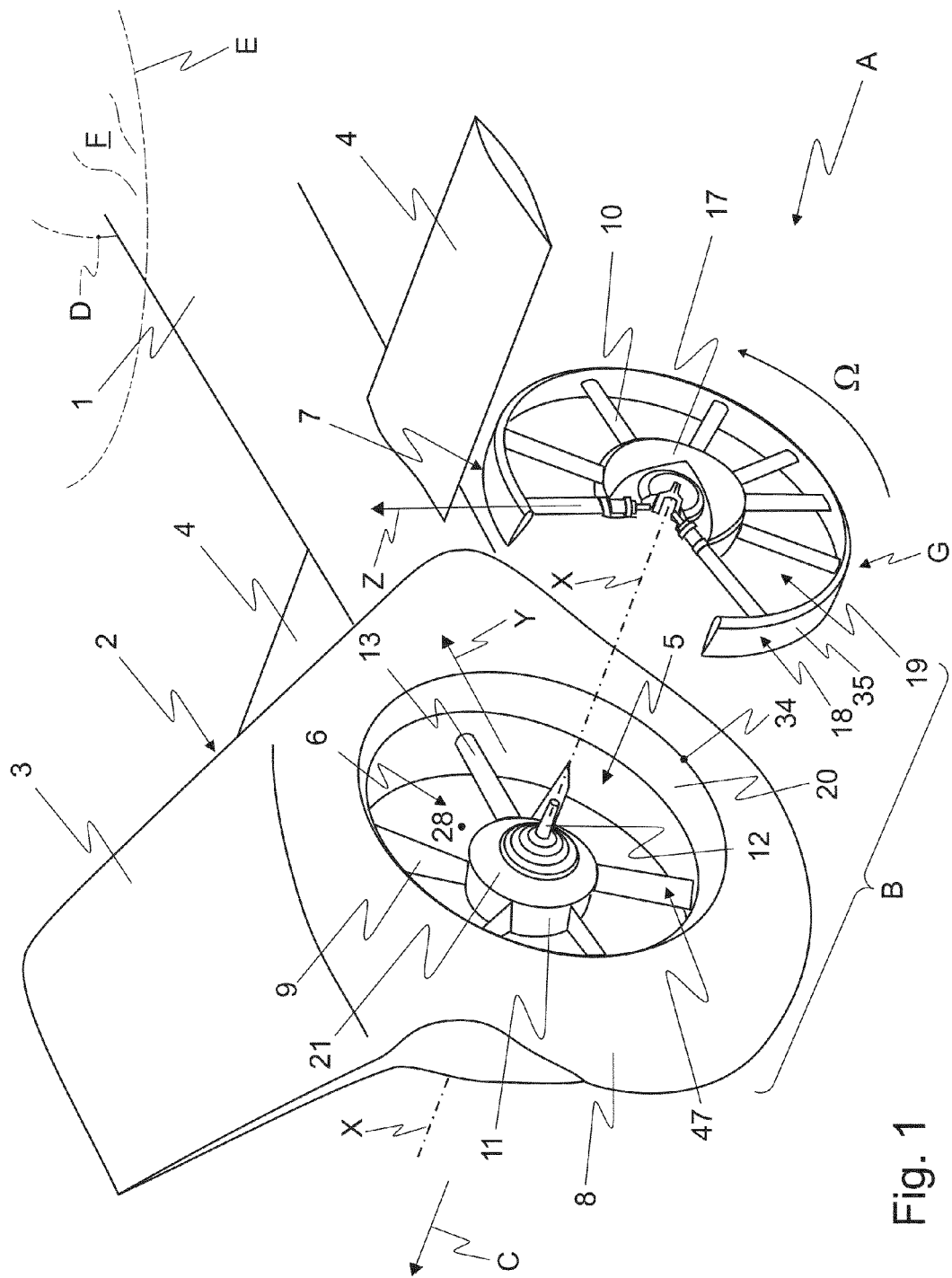
FIG. 1 is a schematic perspective part split-view of an example of propulsion rotor assembly as per the invention, forming a shrouded anti-torque rotor mounted on a tail boom belonging to the fuselage of a rotary wing aircraft and having an aerodynamic outer toroid spoiler coupled with blades tips of a driven rotor system.

A detailed description of illustrated embodiments follows. In figure drawings, elements that are similar are given the same reference numerals.

In FIGS. 1-7 and 9-10, are shown three mutually orthogonal directions X, Y and Z.

A reference direction X referred to as being "longitudinal" or "rotary axis" corresponds to the length dimension of the structures described. Terms such as front/rear are relative thereto. In a propulsion rotor assembly of an aircraft, upstream/downstream or inlet/outlet refers to orientations/locations along with this longitudinal direction X. For instance, a controlled airflow is willingly considered as being directed along this direction X. This direction is parallel to an eponymous longitudinal rotary axis X.

Another direction Y, said to be "transverse", corresponds to the thickness or lateral dimension of the structures described. The terms "side" or "left" right" are relative thereto. For simplification purposes, this direction Y is sometimes said to be horizontal. For rotational items, the transverse direction is rotated around the longitudinal direction.

Another direction Z, referred to as "radial" direction, corresponds to the length/height of the structures described: terms such as up/down or lower/upper are relative thereto. For simplification purposes, this direction Z is sometimes said to be vertical. For rotational items, the transverse direction is rotated around the longitudinal direction.

The directions X, Y and Z together define a referential XYZ.

Herein, the term "toroid" is, as in geometry, a surface generated by rotating a closed plane curve about a coplanar line that does not intersect the curve. The term toroid refers also to the solid structure enclosed by such a surface. Similarly, is called a "torus", a ring-like annulus surface/item generated by rotating a circle about a coplanar line that does not intersect the circle. A "spoiler" is understood as an aerodynamic device fitted to a vehicle e.g. to increase drag and reduce lift, usually extended into the airflow to enhance/modify aerodynamic behavior of the vehicle.

On the figures, a vehicle A is illustrated. In this example, the vehicle A is an aircraft, in fact a rotary wing aircraft such as a helicopter. The vehicle A is equipped with one or a plurality of propulsion rotor assemblies B. Into each propulsion rotor assembly B, a control airflow C (FIG. 3) is created by rotating the rotor blades 10. As of the invention, the propulsion rotor assembly B is of the shrouded type. In short, the propulsion rotary assembly B is including:

a driven rotor system 7 including the rotor blades 10, and
a stator hollow structure 8.

On FIG. 1, the stator hollow structure 8 comprises: an empennage 2, a vertical stabilizer 3, an outer shroud 5 also called inside vessel arrangement, with a tubular duct/hollow duct 6. The stator hollow structure 8 of FIG. 1 also comprises: a central hub 11 with a static control body surrounding a rear transmission box. This rear transmission box is part of the motion source F.

The vehicle A of FIG. 1 has a fuselage D and a main rotor E. From FIG. 1, the perspective view shows a tail boom 1 of the vehicle A of the helicopter type. The tail boom 1 forms a holding structure for the stator hollow structure 8.

In the vehicle A of the FIG. 1, a single propulsion rotor assembly B is fixedly mounted as the aft ending of the tail boom 1. The propulsion rotary assembly B is an anti-torque device having a driven rotor system 7 of the multi-blade variable pitch type.

Depending on embodiments of the invention, one or a plurality of propulsion rotor assemblies B are mounted on various locations/parts of the vehicle A. Even if in shown embodiments, the stator hollow structure C is mounted on the vehicle A in a fixedly secured manner (as per FIG. 1), in other embodiments of the invention, one or a plurality of propulsion rotor assemblies B are articulated on the vehicle A, e.g. in pivotal or swiveled manner (ball joint or the like) and/or slidably movable.

On FIG. 1, the tail boom 1 fixedly supports at its rear end the propulsion rotor assembly B. The stator hollow structure 7 has an empennage 2 with a vertical stabilizer 3 for aiding control in yaw of the vehicle A, as an upper part. The tail boom 1 has a horizontal stabilizer 4. The horizontal stabilizer 4 has two laterally extended control surfaces (left/right) on both sides of the tail boom 1, for aiding control in pitch of the vehicle A.

The propulsion rotor assembly B is mechanically driven and/or electrically motorized through a motion source F (FIG. 1). The propulsion rotor assembly B of FIG. 1 has the driven rotor system 7 rotated around the longitudinal rotary axis X, through the central hub/control body of transmission gear box 11.

Classically in a helicopter, the stator hollow structure 8 of FIG. 1 is having, in the central hub 11, a transmission gear box 21 mechanically connected to the motion source F. Other embodiments of the invention provide for other type of motion sources F e.g. in the form of an electrical motor or fuel consuming motor.

Also in some embodiments, the motion source F is either ancillary to the propulsion rotor assembly B, or at last partly integrated to the propulsion rotor assembly B. For instance, the central hub 21 includes an electrical motor. In embodiments, the propulsion rotor assembly B incorporates the motion source F.

For instance, the driven rotor system 7 includes at least one rotor portion of an electrical motor while the stator hollow structure 8 incorporates at least one stator portion of the electrical motor. On FIG. 2, the propulsion rotor assembly B is having at least one electromagnetic drive outer device 33, possibly a plurality of such devices 33, distributed around an outer external surface of a spoiler 18.

On FIG. 1, in the propulsion rotor assembly B, the inside vessel surface 5 is extending along the longitudinal rotary axis X between two longitudinally opposed transverse distal openings 28 and 34.

Along the control airflow C, an upstream transverse distal opening 34 is located upstream (left on FIG. 3), and is called inlet. Opposed along C, to the upstream transverse distal opening 34, a downstream transverse distal opening 28 forms an exit surface for the control airflow C producing thrust useful to the vehicle A. The transverse distal opening 28 is located downstream (right on FIG. 3), and is called outlet. The transverse distal opening 28 is allowing outlet of the control airflow C to exhaust from the propulsion rotor assembly B.

Classically, in FIG. 1, each rotor blade 10 has two radial endings. One radial ending is a bottom/inner blade shank (foot) of the rotor blade 10, being located closer from the longitudinal rotary axis X. Another radial ending is an external/outer tip 23 of the rotor blade 10, being distal from the longitudinal rotary axis X. The external/outer tip 23 is radially opposed to the inner shank, with the blade shank being mounted on the central hub 11, while the rotor blades 10 are locally separated from neighboring blades (10) by angular air spacing (see angles "α" and "β" on FIG. 3).

FIG. 1 shows that the propulsion rotor assembly B includes, in the inside vessel arrangement or outer shroud 5 of the stator hollow structure 8, by at least one of the transverse distal openings 28 or 34, an enlarged static circumference housing 20 in the form of an outer duct portion for the hollow duct 6. As per the invention, the static circumference housing 20 is opened towards the outside of the stator hollow structure 8 (i.e. in a way opposed to the control airflow C on FIG. 1).

FIG. 1 also shows that the propulsion rotor assembly B includes an aerodynamic outer toroid spoiler 18 that forms an inner shroud which rotates with the driven rotor system 7. This being detailed below, the aerodynamic outer toroid spoiler 18 is having a cross section (FIG. 3) in the shape of a profiled airfoil type.

Generally speaking, the aerodynamic outer toroid spoiler 18 is shaped with an outer external surface 35 complementary to the static circumference housing 20, but smaller than the static circumference housing 20. Besides, the aerodynamic outer toroid spoiler 18 is pivotally linked and radially secured to each outer tip 23 of the rotor blades 10. Thus, the outer toroid spoiler 18 is:

longitudinally, upright with the distal opening (28/34) of the static circumference enlarged housing 20, radially remote from the static circumference enlarged housing 20;

with the outer external surface 35 facing the static circumference housing 20; and distanced from the static circumference housing 20 by a torus air gap G.

As detailed below, with the invention a supplemental outer laminar flux is admitted into the propulsion rotor assembly B, together with an inlet inner stream (central inlet). The outer laminar flux is guided through the torus air gap G between the circumference enlarged housing 20 and the aerodynamic outer toroid spoiler 18 towards the outlet transverse distal opening 28, while the inlet main stream from inlet 34 and the outer laminar flux are converged to smoothly merge together in a single outlet airflow C.

Figure 3:
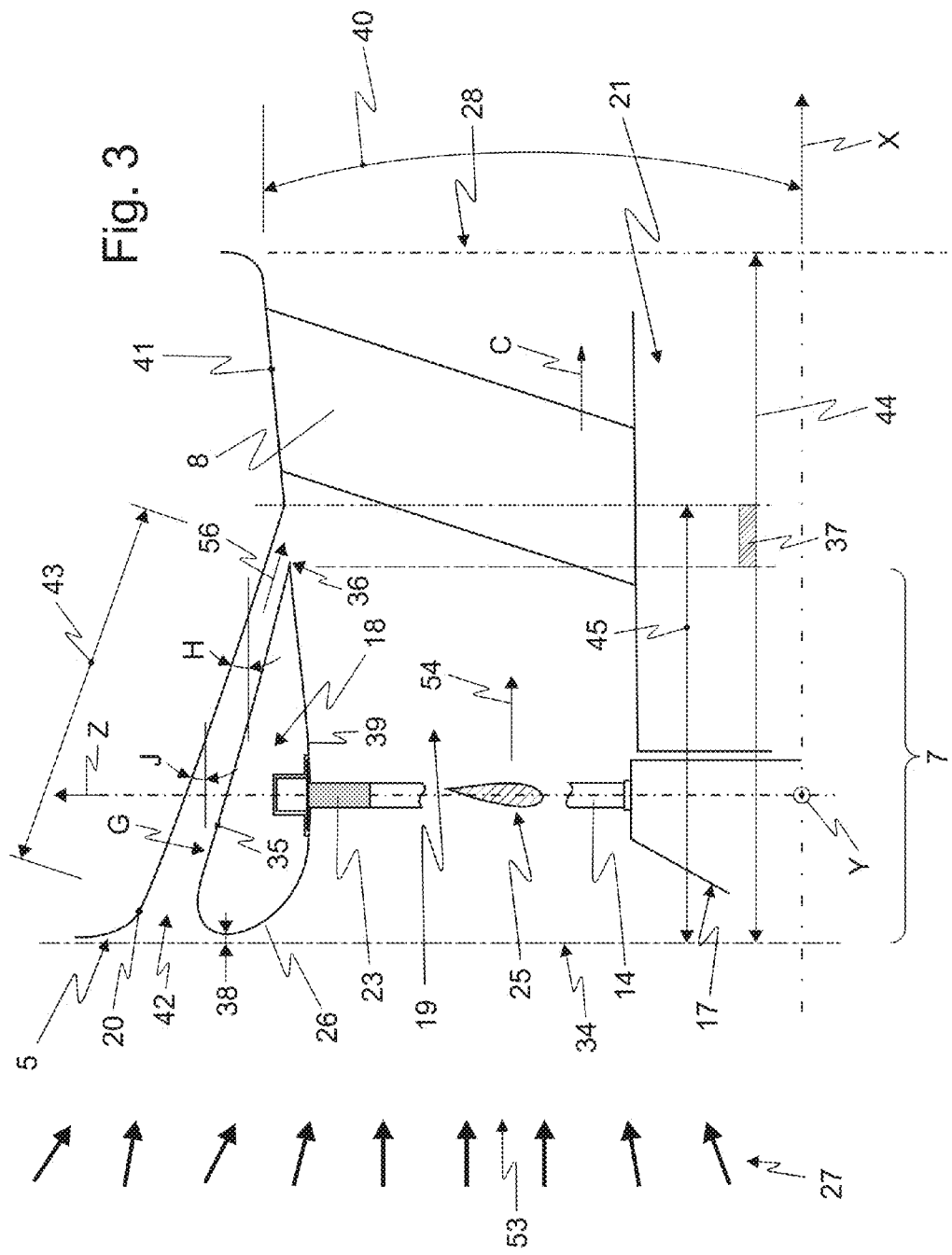
FIG. 3 is a longitudinal section part view of an example of propulsion rotor assembly as per the invention, showing some dimension ranges, angular ranges and arrangement distributions of an aerodynamic outer toroid spoiler.

In FIG. 1, the aerodynamic outer toroid spoiler 18 is mechanically linked to the outer tips of the rotor blades 10 forming a continuous circular ring. The aerodynamic outer toroid spoiler 18 has a front portion leading edge 26, forming an inlet lip for the inner shroud. The aerodynamic outer toroid spoiler 18 also has a rear portion trailing edge 36. Thus, the outer rearward portion of the aerodynamic outer toroid spoiler 18 is defining a converging angle H (FIG. 3). The converging angle H is comprised between: 5 and 30 degrees.

Besides, the rear portion trailing edge 36 is defining a converging area 37 at a longitudinal direction location in the stator hollow structure 8. The converging area 37 is closer to the downstream distal opening 28 of the stator hollow structure 8, than to the upstream distal opening 34 of the circumference enlarged housing 20. In the embodiment of FIG. 3, a front portion leading edge 26 is located longitudinally backwards, of a backwards decay 38 longitudinally comprised between 1 mm to 50 mm.

In FIG. 3, the front portion leading edge 26 and a rear portion trailing edge 36 are outwardly joined by the outer external surface 35 and by an inside cylindrical surface 39, joining the front portion leading edge 26 to the rear portion trailing edge 36. Here, the outer external surface 35 is cone shaped and is having a rectilinear outer profile, generally oriented relative the longitudinal rotary axis X, by an acute stream-flux ducted angle H. The acute stream-flux ducted angle H is here comprised between 5 and 30 degrees. The inside cylindrical surface 39 and the rear portion 41 of the inside vessel arrangement 5 are oriented relative to the longitudinal rotary axis X by an inside expansion angle 40 (FIG. 3) comprised between 0 and 10 degrees.

In FIG. 3, the inside cylindrical surface 35 is radially flush with a front portion of the inside vessel arrangement 5

(including the housing 20) and is radially separated from the front portion of the inside vessel arrangement 5 by the torus air gap G. Here, the inside cylindrical surface 39 is flush with and parallel to a rear portion 41 of the inside vessel arrangement. The inside cylindrical surface 39 and the rear portion 41 of the inside vessel arrangement 5 are oriented relative to the longitudinal rotary axis X, by an inside expansion angle J. The expansion angle J is here comprised between 0.1 and 30 degrees.

In FIG. 3, the front portion leading edge 26 and a front transverse distal opening together of the torus air gap G define with the static circumference housing 20 an inlet mouth 42. Here, the inlet mouth 42 of the torus air gap G has an outer convex surface of a rounded shape and an inner convex surface of a rounded shape, radially facing one another. Here, the aerodynamic outer toroid spoiler 18 is having chord line 43. The chord line 43 is having a longitudinal dimension chosen, respective to a longitudinal overall dimension 44 of the inside arrangement vessel 5, comprised between ⅓ and ½. The torus air gap G is having a laminar flux longitudinal dimension 45 chosen, respective to a longitudinal overall dimension 44, comprised between ½ and ¾.

From FIGS. 4-7, each rotor blade 10 have an outer tip section fixed to a rotatable connecting disk 29 and extended into a movable dry-disk 24 fixation point. Here, the movable dry-disk 24 is inserted into a bearing means 46 of the inside vessel arrangement 5. On FIG. 6, the outer tip 23 (section) has a V-shaped ending, defining a separation hollow zone. The V-shaped ending enhances the guidance of the air flow and reduces the air turbulences in the inside vessel arrangement 5.

Figure 4:
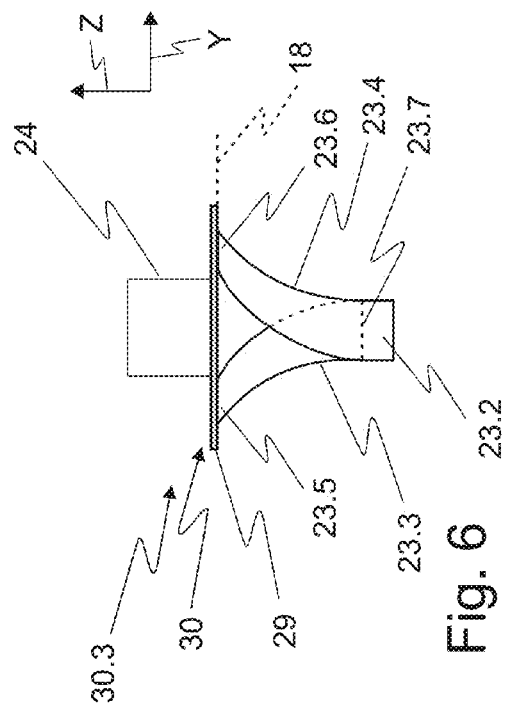
FIG. 4 is a radial upright view of a dry disk connecting part, to be pivotally mounted between a guiding outer canal of an aerodynamic outer toroid spoiler and outer tips of rotor blades.
Figure 5:
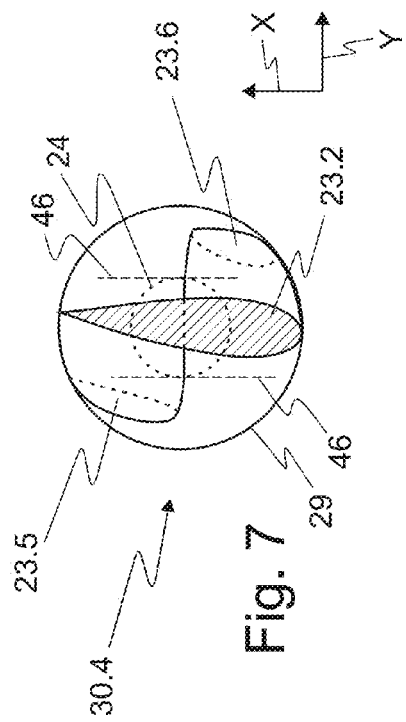
FIG. 5 is a radial upper view of a dry disk connecting part, as per FIG. 4.

In FIGS. 4-7 two alternatives embodiments for the rotor blade 10 tip sections are shown. FIG. 4 shows at side view 30.1 of an embodiment with a blade tip 23.1 being fixed to a rotatable fixation disk 29 and extended into a movable dry-disk fixation point 24 which is designed to be inserted into a bearing of the inner shroud. FIG. 5 as a bottom view 30.2 of this embodiment, showing the droplet shape 23.1 of the rotor blade section.

Figure 6:
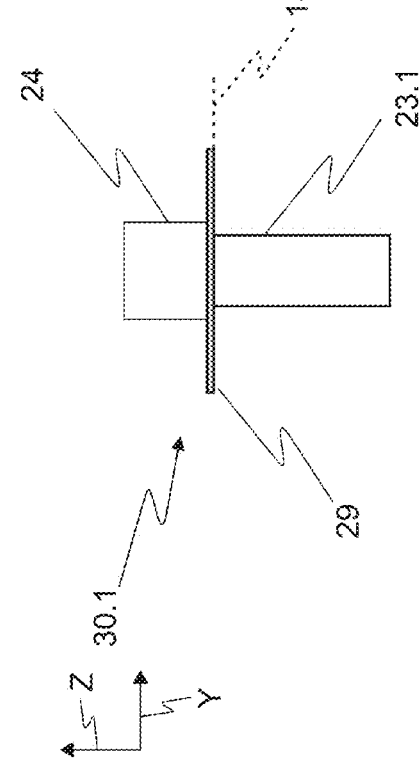
FIG. 6 is a lateral upright view of a dry disk connecting part as per FIG. 4, showing a V-shaped ending defining a separation hollow zone.
Figure 7:
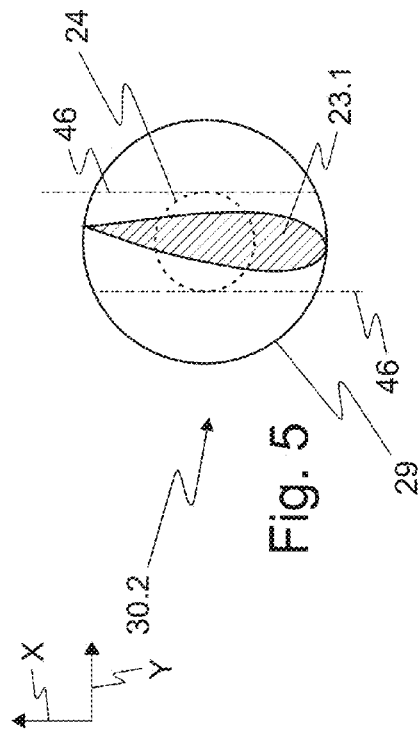
FIG. 7 is a radial upper view of a dry disk connecting part as per FIG. 6, showing a "S profile" of a "V shape" ending.

In FIGS. 6-7 the tip of the rotor blade 10 is split into two parts, a leading part 23.4 which is bent to the right and a trailing part 23.3 which is bent to the left, after a line of separation 23.7. Up to the line of separation, the blade 23.2 is identical to the main section of the rotor blade 10 of FIGS. 4-5. The fixation points of the tips 23.4 and 23.3 are designated as 23.6 and 23.5. The fixation points 23.6 and 23.5 are also shown on FIG. 7, which is a side view 30.3 of this split blade tip embodiment. FIG. 7 shows as a bottom view 30.4, the same embodiment than FIG. 6. An advantage of this split blade tip 30 is the improved guidance of the air flow which is able to reduce the air turbulences in the inside vessel arrangement 5.

The driven rotor system 7 is mounted in such a way to rotate coaxially in an outer duct 20, and flow-straightening stator 8, arranged and fixed in the duct 6 in the downstream of the rotor 7 including a set of fixed vanes 9 arranged in star configuration about the longitudinal direction X, i.e. forming the rotary axis of the rotor blades 10 and a general symmetry axis for the tubular/hollow duct 6.

In an embodiment, each rotor blade have an outer tip 23 section fixed to a rotatable connecting disk and extended into a movable dry-disk fixation point which inserted into a bearing means of the inside vessel arrangement, the outer tip section having a V shaped ending defining a separation hollow zone, for guidance of the air flow and reducing the air turbulences in the inside vessel arrangement.

Summarizing the above, the embodiment of FIG. 1 proposes a shrouded driven rotor system 7 mounted in the hollow duct 6 on its inlet side onto a rotor drive shaft 12. The driven rotor system 7 rotates together with the aerodynamic outer toroid spoiler 18 inside the outer duct thus forming a double shrouded anti-torque device. It is rotationally driven by the rear transmission box within the central hub 11, coaxially with the hollow duct 6. The aerodynamic outer toroid spoiler 18 is driven together with the central hub 11 securely fixed to the empennage 2 by the vanes 9 of a flow straightener 47 (FIG. 1).

Here, the tail rotor transmission box 21 and consequently the drive shaft 12 are driven from a transmission shaft from the motion source F, through a transmission arm 13 in the duct 6. The transmission arm 13 is replacing one of the vanes 9 of the flow-straightener 47. In this way, the driven rotor system 7 creates a guided air flow giving rise to the transverse counter-torque thrust, which is useful for balancing the vehicle A (e.g. a helicopter) in yaw. In order to vary the power of this transverse thrust, the rear transmission box contains here a device for collective control of the pitch of the blades 10 by means of a collective pitch change rod (not represented) inside the transmission arm 13. From FIG. 2, the device for collective control is moving each of pitch control nozzles 16 of the rotor blades 10.

Another embodiment proposes to control the thrust of the double-shrouded propulsion rotor assembly B by changing the rotational speed of the driven rotor system 7, which is easily achievable for electrically driven rotors but more difficult for turbine driven rotors. Thrust control is also realized in embodiments of the invention, by a combination of both techniques.

The vanes 9 in the duct 6 downstream of the rotor 7 recover the rotational energy of the air flow by straightening out this flow towards the longitudinal direction X or axis of the hollow duct 6 and procuring a supplementary counter-torque thrust. Such recovery is exposed e.g. in documents FR2534222 or U.S. Pat. No. 4,585,391).

Figure 2:
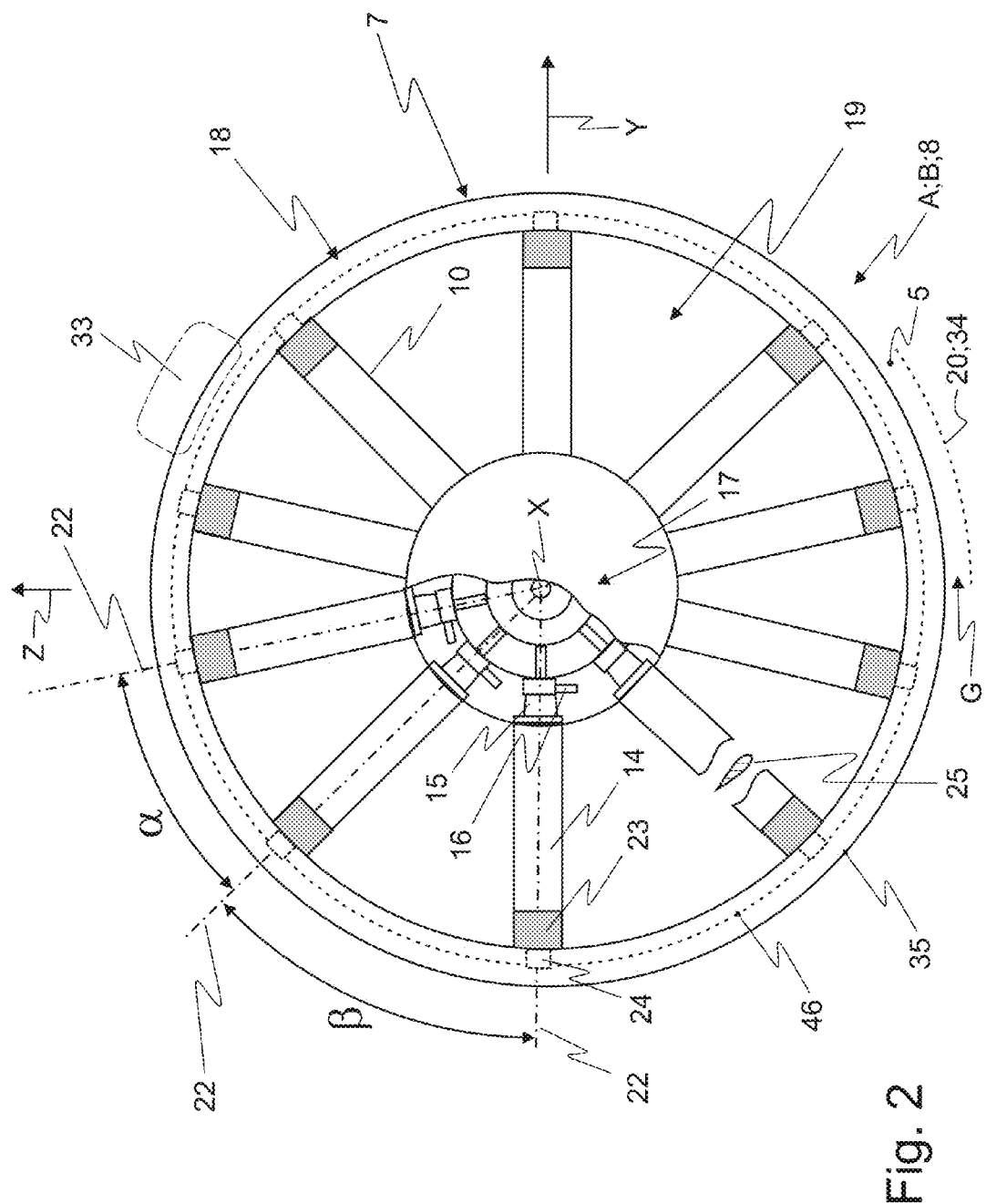
FIG. 2 is a planar side view of an example of propulsion rotor assembly as per the invention, partly split so as to partly show the inside of a central hub and an aerodynamic outer toroid spoiler with bearing means for outer tips of rotor blades.

From embodiment of FIG. 2, in a side view shows a rotor with ten rotor blades 10, a rotor hub assembly 17 (forming the central hub 11) and the aerodynamic outer rotor spoiler 18 mounted on a driven rotor system 7. The number of rotor blades 10, in a given rotor system 7, vary according to the embodiments. But each of the rotor blades 10 has an aerodynamic profile such as the one shown in 25 on FIG. 2. In general, for acoustic optimization the rotor blades 10 have each a pitch axes 22, and different angular distances between the pitch axes 22 of the rotor blades 10, e.g. unequal "α" and "β" angles.

On FIG. 3, free spaces between the rotor blades 10 constitute the front part of an inner duct 19 defining the inside cylindrical surface of the spoiler 18. Thus, the inner duct 19 is fully and continuously surrounded by the aerodynamic outer toroid spoiler 18. The aerodynamic outer toroid spoiler 18 is mounted on the outer tips 23 of the rotor blades 10, by dry-disk fixation joints 24. Apart from the dry-disk fixation joints 24 each blade 10 comprises a blade tip (23) section, a main blade section 14 with an aerodynamic profile 25, an inner shank 15 or blade root formed as a cuff, and a twistable and preferably also flexible fitting with a pitch control nozzle 16 for changing the pitch of the blades 10.

Also from embodiment of FIG. 3 is viewed an axial half section through the double shrouded propulsion rotor assembly B, showing the outer shroud 5, the inner shroud 18 fixed on the rotor blade tip section 23, the rotating rotor hub assembly 17, and the tail rotor transmission box assembly 21. The stator is installed at the common downward part of the outer duct 20 and the inner duct 19, close to the exit plane of the air flow 28 producing the thrust. The inner shroud is aerodynamically formed and contains an inlet lip 26 at the inlet side for a smooth streaming into inner duct 19 of the air flow 27.

Here, the most part of the air flow (or part of the air flow) which is directed perpendicular to the rotor axis (e.g. in case the helicopter is in forward flight) is flowing around the inlet of the outer shroud 5 into the outer duct 20 and then downstream the common part of the inner and outer duct up to the exit plane 28. In this way, this perpendicular air flow does not disturb the inflow of the transverse inflow and does not lead to lip separation inside the inner duct. This is illustrated on FIGS. 9-10.

Figure 8:
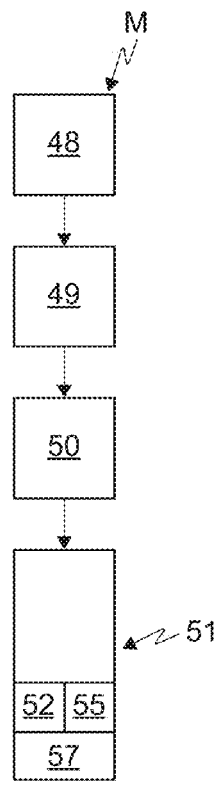
FIG. 8 is a diagrammatic flow chart exposing some interesting steps and stages of a method according to the invention.

Reverting to another object of the invention, the FIG. 8 illustrates an embodiment of a method M for producing a controlled airflow C from a propulsion rotor assembly B for a vehicle A.

As per FIG. 8, the method M of the invention includes:
an inside vessel arrangement step 48 of providing in the stator hollow structure 8 at least one of the transverse distal openings (28; 34) with an enlarged static circumference housing(s) 20, opened towards the outside of the stator hollow structure 8;
a toroid spoiler provision step 49 of producing an aerodynamic outer toroid spoiler 18 in the shape of a profiled airfoil type; the aerodynamic outer toroid spoiler 18 being shaped with an outer external surface 35 complementary to the static circumference housing 20, but smaller than the circumference enlarged housing 20;
a tip to spoiler securing step 50, of pivotally linking and radially securing the aerodynamic outer toroid spoiler 18 to each outer tip 23 of the rotor blades 10, so that the outer toroid spoiler 18 is: longitudinally upright with a corresponding distal opening (28; 34) of the circumference enlarged housing 20, radially remote from the circumference enlarged housing 20 with the outer external surface 35 facing the circumference enlarged housing 20 and distanced from the circumference enlarged housing 20 by a torus air gap G; and
a controlled airflow producing step 51, having:
an inlet inner stream crossing stage 52, wherein from a common external inlet flux 53 (FIG. 3) an inlet inner stream 54 (FIG. 3) is crossing the inside of the inner duct 19 of the aerodynamic outer toroid spoiler 16 and passing through the rotor blades 10;
an outer admitting stage 55 (simultaneous/parallel to stage 52) wherein an outer laminar flux 56 (FIG. 3) is admitted with the inlet inner stream 54 and guided through the torus air gap G between the circumference enlarged housing 20 and the aerodynamic outer toroid spoiler 18, towards the transverse distal opening longitudinally 28 opposed to the circumference enlarged housing 20; and
a converging stage 57 wherein the inlet main stream 54 and outer laminar flux 56 are merging by converging together in a single outlet control airflow C.

In the embodiment of FIG. 8, the inlet inner stream crossing stage 52 and the outer admitting stage 55 are respectively performed along an inlet inner direction (X) and an outer admitting direction, the inlet inner direction being oriented respective to the outer admitting direction (X) with at least one acute stream-flux ducted angle (J/H). Here, the converging stage is performed with the inlet main stream 54 and the outer laminar flux 56 directed one relatively the other by a converging angle H comprised between 5 and 30 degrees.

On FIG. 8, the converging stage is performed at a converging area 37 located in the longitudinal direction X at a location of the stator hollow structure 8, closer to the opposed downstream distal opening 28 than to the upstream distal opening 34 of the circumference enlarged housing 20.

Figures 9, 10:
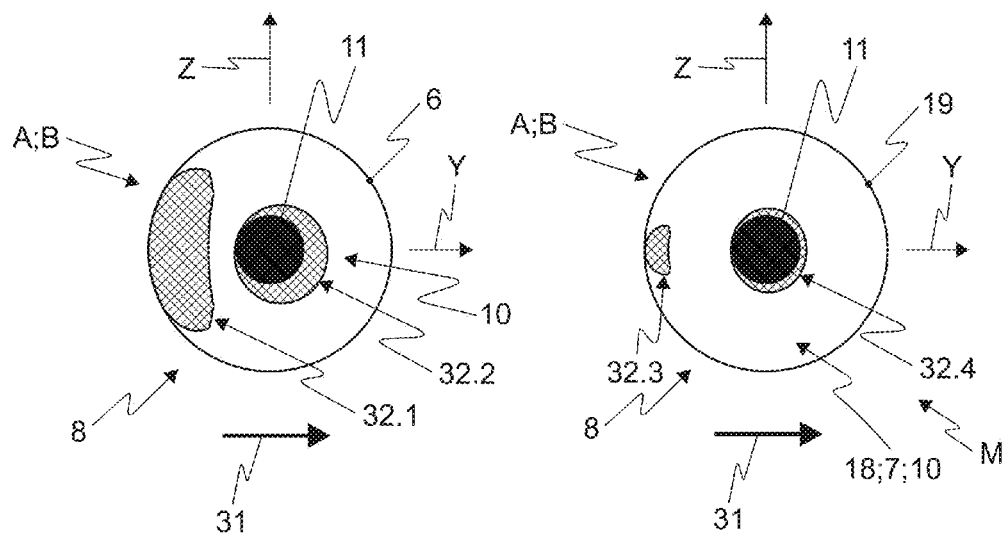
FIGS. 9 and 10 are schematic part views similar to FIG. 2, showing the air pressure differences between a normal shrouded rotor (FIG. 9) and a double shrouded rotor (FIG. 10) according to the invention.

FIGS. 9 and 10 are schematically comparing the air pressure between a classical shrouded rotor (FIG. 9) and a double shrouded rotor (FIG. 9) according to the invention. FIGS. 9-10 show a cross wind 31 of more than 10 m/s. An art loss region due to inlet lip separation is referenced as 32.1 on FIG. 9. The considerable surface extension of this art loss region 32.1 due to prior art inlet lip separation illustrates a major stake faced in classical shrouded rotors. In comparison, a reduced loss region 32.3 as per the invention, due to inlet lip separation is limited, almost eliminated.

Similarly, an art loss zone 32.2 due to hub (11) corner is shown on FIG. 9. The considerable surface extension of this art loss zone 32.2 due to prior art due to hub corner illustrates a major stake faced in classical shrouded rotors. In comparison, a reduced loss zone 32.4 as per the invention, due to hub corner is significantly reduced.

From this comparison, some beneficial effects provided by the invention appear. The invention increases the efficiency and performance, of shrouded propulsion rotary assemblies B e.g. for tail rotors. The invention clearly achieves a significant improvement of the aerodynamic performance of the shrouded propulsion rotary assembly C, especially by:
reducing the induced drag from the tip clearance and consequently significantly reducing the noise caused by mini-vortices around the rotor tips and the wall of the shroud.
reducing the air flow separation at the inlet lip on the leading side of the shrouded/ducted tail rotor.
reducing the air flow separation at the trailing side of the hub. The following table T1 is listing the references signs in the drawings.

TABLE T1

| | |
|---|---|
| α | angle of angular air spacing |
| β | angle of angular air spacing |
| A | vehicle, e.g. rotary wing aircraft (rotorcraft) |
| B | propulsion rotor assembly |
| C | control airflow. |
| D | fuselage |
| E | main rotor |
| F | motion source |
| G | torus air gap |
| H | converging angle |
| J | expansion angle |
| M | method of the invention |
| X | longitudinal direction (rotary axis) |
| Y | transverse direction |
| Z | radial direction |
| 1 | tail boom |
| 2 | empennage |
| 3 | vertical stabilizer. |
| 4 | horizontal stabilizer with control surfaces (left/right) |
| 5 | inside vessel arrangement e.g. outer shroud |
| 6 | tubular/hollow duct |
| 7 | driven rotor system i.e. rotor |
| 8 | stator hollow structure i.e. stator |
| 9 | vannes |
| 10 | rotor blades |
| 11 | central hub or control body of transmission gear box |
| 12 | rotor drive shaft |
| 13 | transmission arm |
| 14 | main blade section |

TABLE T1-continued

| | |
|---|---|
| 15 | inner shank or blade root (blade root cuff) |
| 16 | pitch control nozzles |
| 17 | rotor hub assembly |
| 18 | aerodynamic outer toroid spoiler |
| 19 | inner duct of the spoiler 18 |
| 20 | static circumference housing e.g. outer duct |
| 21 | central hub e.g. transmission box assembly |
| 22 | pitch axes of the rotor blades 10 |
| 23 | outer tips of the rotor blades 10 |
| 24 | movable dry-disk |
| 25 | aerodynamic profile |
| 26 | front portion leading edge 26 e.g. inlet lip for the inner shroud |
| 27 | airflow direction |
| 28 | upstream transverse distal opening |
| 29 | rotatable connecting disk |
| 30 | split blade tip (V-shaped) |
| 31 | cross wind (of more than 10 m/s) |
| 32.1 | art loss region due to inlet lip separation |
| 32.2 | art loss zone due to hub corner |
| 32.3 | reduced loss region at inlet lip (invention) |
| 32.4 | reduced loss zone at hub corner (invention) |
| 33 | electromagnetic drive outer device |
| 34 | downstream transverse distal opening |
| 35 | outer external surface of the spoiler 18 |
| 36 | rear portion trailing edge |
| 37 | converging area |
| 38 | backwards decay |
| 39 | inside cylindrical surface of the spoiler 18 |
| 40 | acute angle (general angle of the vessel 5) |
| 41 | rear portion of the inside vessel arrangement 5 |
| 42 | inlet mouth of the torus air gap |
| 43 | chord line of the spoiler 18 |
| 44 | longitudinal overall dimension |
| 45 | laminar flux longitudinal dimension |
| 46 | bearing means |
| 47 | flow straightener |
| 48 | inside vessel arrangement step |
| 49 | toroid spoiler provision step |
| 50 | tip to spoiler securing step |
| 51 | controlled airflow producing step |
| 52 | inlet inner stream crossing stage |
| 53 | common external inlet flux |
| 54 | inlet inner stream |
| 55 | outer admitting stage |
| 56 | outer laminar flux |
| 57 | converging stage |

The invention may be subjected to variations as to its implementation, said variations not being possibly identified exhaustively.

What is claimed is:

1. A propulsion rotor assembly for a vehicle, the propulsion rotor assembly being motorized or mechanically driven through a motion source; the propulsion rotor assembly having at least: a driven rotor system to be rotated longitudinally around a rotary axis parallel to a length dimension of the propulsion rotor assembly and a stator hollow structure housing the driven rotor system; the stator hollow structure having a central hub and a hollow duct defining an inside vessel surface; the inside vessel surface being extending along the longitudinal rotary axis between two longitudinally opposed transverse distal openings; the driven rotor system being functionally mounted in the inside vessel surface, pivotal on the central hub and having a plurality of rotor blades; the rotor blades being motorized/mechanically driven by the motion source, so that the rotor blades are rotated around the rotary axis, when a controlled airflow is required; the rotor blades have an inner shank radially opposed to an outer tip, with the inner shank being mounted on the central hub, while the rotor blades are locally separated from neighboring blades by an angular air spacing; characterized in that the propulsion rotor assembly includes:

an inside vessel arrangement fixedly secured in the stator hollow structure in at least one of the transverse distal openings, the inside vessel arrangement having an enlarged static circumference housing opened towards the outside of the stator hollow structure; and an aerodynamic outer toroid spoiler in a shape of a profiled airfoil type; the aerodynamic outer toroid spoiler being shaped with an outer external surface complementary to the static circumference housing, but smaller than the static circumference housing; the aerodynamic outer toroid spoiler being pivotally linked and radially secured to each outer tip of the rotor blades, so that the outer toroid spoiler is: longitudinally upright with a distal opening of the circumference enlarged housing(s), radially remote from the circumference enlarged housing(s) with the outer external surface facing a corresponding static circumference housing and distanced from the corresponding static circumference housing by a torus air gap; so that an outer laminar flux is admitted simultaneously with/in parallel to an inlet inner stream and guided through the torus air gap between the circumference enlarged housing and the aerodynamic outer toroid spoiler towards the transverse distal opening longitudinally opposed to the circumference enlarged housing, and the inlet main stream and outer laminar flux are converged to merge together in a single outlet control airflow.

2. A propulsion rotor assembly of claim 1, wherein the aerodynamic outer toroid spoiler is mechanically linked to the outer tips of the rotor blades forming a continuous circular ring, and the aerodynamic outer toroid spoiler having a front portion leading edge and a rear portion trailing edge, the rear portion trailing edge defining a converging angle comprised between: 5 and 30 degrees.

3. A propulsion rotor assembly of claim 1, wherein the aerodynamic outer toroid spoiler is having a front portion leading edge and a rear portion trailing edge, the rear portion trailing edge defining a converging area at a converging location in the stator hollow structure longitudinally closer to the opposed distal opening of the stator hollow structure, than to the distal opening of the circumference enlarged housing.

4. A propulsion rotor assembly of claim 1, wherein the aerodynamic outer toroid spoiler is having a front portion leading edge located longitudinally backwards of a backwards decay comprised between 1 mm to 50 mm.

5. A propulsion rotor assembly of claim 1, wherein the aerodynamic outer toroid spoiler is having a front portion leading edge and a rear portion trailing edge outwardly joined by the outer external surface, and an inside cylindrical surface joining the front portion leading edge and the rear portion trailing edge.

6. A propulsion rotor assembly of claim 1, wherein the aerodynamic outer toroid spoiler is having a outer external surface joining a front portion leading edge and a rear portion trailing edge outwardly, the outer external surface being cone shaped and having a rectilinear outer profile oriented relative the rotary axis, by an acute stream-flux ducted angle comprised between: 0.1 and 30 degrees.

7. A propulsion rotor assembly of claim 1, wherein the aerodynamic outer toroid spoiler is having a front portion leading edge and a rear portion trailing edge and an inside cylindrical surface joining the front portion leading edge and the rear portion trailing edge, the inside cylindrical surface being radially flush with a rear portion of the inside vessel arrangement and radially separated from the front portion of the inside vessel arrangement by the torus air gap.

8. A propulsion rotor assembly of claim 1, wherein the aerodynamic outer toroid spoiler is having a front portion leading edge and a rear portion trailing edge and an inside cylindrical surface joining the front portion leading edge and the rear portion trailing edge, the inside cylindrical surface being flush with and parallel to a rear portion of the inside vessel arrangement.

9. A propulsion rotor assembly of claim 1, wherein the aerodynamic outer toroid spoiler is having a front portion leading edge and a rear portion trailing edge and an inside cylindrical surface joining the front portion leading edge and the rear portion trailing edge, the inside cylindrical surface and a rear portion of the inside vessel arrangement being oriented relative to the longitudinal rotary axis by an inside expansion angle comprised between: 0 and 10 degrees.

10. A propulsion rotor assembly of claim 1, wherein the aerodynamic outer toroid spoiler is having a front portion leading edge and a front transverse distal opening together with the static circumference housing defining a inlet mouth for the torus air gap, the inlet mouth having an outer convex surface of a rounded shape and an inner convex surface of a rounded shape, radially facing one another.

11. A propulsion rotor assembly of claim 1, wherein the aerodynamic outer toroid spoiler is having chord line of a longitudinal dimension chosen, respective to a longitudinal overall dimension of the inside arrangement vessel, comprised between: ⅓ and ½.

12. A propulsion rotor assembly of claim 1, wherein the torus air gap is having a longitudinal dimension chosen, respective to a longitudinal overall dimension of the inside arrangement vessel, comprised between: ½ and ¾.

13. A propulsion rotor assembly of claim 1, wherein each rotor blade have an outer tip section fixed to a rotatable connecting disk and extended into a movable dry-disk fixation point which inserted into a bearing means of the inside vessel arrangement, the outer tip section having a V-shaped ending defining a separation hollow zone, for guidance of the air flow and reducing air turbulences in the inside vessel arrangement.

14. A method for producing a controlled airflow from a propulsion rotor assembly for a vehicle; the propulsion rotor assembly being motorized or mechanically driven through a motion source; the propulsion rotor assembly having at least: a driven rotor system to be rotated longitudinally around a rotary axis parallel to a length dimension of the propulsion rotor assembly and a stator hollow structure housing the driven rotor system; the stator hollow structure having a central hub and a hollow duct defining an inside vessel surface; the inside vessel surface being extending along the longitudinal rotary axis between two longitudinally opposed transverse distal openings; the driven rotor system being functionally mounted in the inside vessel surface, pivotal on the a central hub and having a plurality of blades; the blades being motorized/mechanically driven by the motion source, so that the blades are rotated longitudinally around the rotary axis, when the controlled airflow is required; the blades have a shank radially opposed to an outer tip, with the blade shank being mounted on the central hub, while the blades are locally separated from neighboring blades by an angular air spacing; wherein the method includes:

an inside vessel arrangement step of providing in the stator hollow structure at least one of the transverse distal openings with an enlarged static circumference housing opened towards the outside of the stator hollow structure;
a toroid spoiler provision step of producing an aerodynamic outer toroid spoiler in the shape of a profiled airfoil type; the aerodynamic outer toroid spoiler being shaped with an outer external surface complementary to the static circumference housing, but smaller than the circumference enlarged housing;
a tip to spoiler securing step, of pivotally linking and radially securing the aerodynamic outer toroid spoiler to each outer tip of the blades, so that the outer toroid spoiler is: longitudinally upright with a distal opening of the circumference enlarged housing, radially remote from the circumference enlarged housing with the outer external surface facing the circumference enlarged housing and distanced from the circumference enlarged housing by a torus air gap; and
a controlled airflow producing step, having:
an inlet inner stream crossing stage, wherein an inlet inner stream is crossing the inside of the aerodynamic outer toroid spoiler and passing through the blades;
an outer simultaneous admitting stage wherein an outer laminar flux is admitted simultaneously with the inlet inner stream and guided through the torus air gap between the circumference enlarged housing and the aerodynamic outer toroid spoiler towards the transverse distal opening longitudinally opposed to the circumference enlarged housing; and
a converging stage wherein the inlet main stream and the outer laminar flux are converging to smoothly merge together in a single outlet control airflow.

15. The method of claim 14, wherein the inlet inner stream crossing stage and the outer simultaneous admitting stage are respectively performed along an inlet inner direction and an outer admitting direction, the inlet inner direction being oriented respective to the outer admitting direction with an at least one acute stream-flux ducted angle.

16. The method of claim 14, wherein the converging stage is performed with the inlet main stream and the outer laminar flux directed one relative to the other by a converging angle between 0.1 and 30 degrees.

17. The method of claim 14, wherein the converging stage is performed at a converging area located in the longitudinal direction location of the stator hollow structure, closer to an outlet distal opening of the stator hollow structure, than to an inlet opposed distal opening.

18. A vehicle equipped with at least one propulsion rotor assembly according to claim 1, wherein the vehicle is chosen in the group consisting of: aircrafts, ships, trains, and automobiles.

19. A vehicle of claim 18, wherein the propulsion rotor assembly is having a stator hollow structure, the stator hollow structure being articulated on a holding structure of the vehicle, by at least one of: pivotal means, swiveled means, slidably movable means.

20. A vehicle of claim 18, wherein the vehicle is a rotary wing aircraft.

* * * * *